United States Patent [19]

Marchman et al.

[11] Patent Number: 5,693,938

[45] Date of Patent: Dec. 2, 1997

[54] OPTICAL PROBE MICROSCOPE HAVING A FIBER OPTIC TIP THAT RECEIVES BOTH A DITHER MOTION AND A SCANNING MOTION, FOR NONDESTRUCTIVE METROLOGY OF LARGE SAMPLE SURFACES

[75] Inventors: Herschel Maclyn Marchman, New Providence; Jay Kenneth Trautman, Chatham, both of N.J.

[73] Assignee: Lucent Technologies Inc., Murray Hill, N.J.

[21] Appl. No.: 657,390

[22] Filed: Jun. 3, 1996

Related U.S. Application Data

[63] Continuation of Ser. No. 328,297, Oct. 24, 1994, abandoned.

[51] Int. Cl.$^6$ ............................... H01J 3/14; H01J 37/00
[52] U.S. Cl. ............................... 250/234; 250/306
[58] Field of Search ............................... 250/234, 227.26, 250/216, 559.19, 559.24, 559.26, 559.49, 306, 307, 309, 310; 73/104, 105; 356/375, 383, 384, 387

[56] References Cited

U.S. PATENT DOCUMENTS

| | | | |
|---|---|---|---|
| 4,758,065 | 7/1988 | Dorman et al. | 350/96.26 |
| 5,081,350 | 1/1992 | Iwasaki et al. | 250/234 |
| 5,196,713 | 3/1993 | Marshall | 250/561 |
| 5,198,715 | 3/1993 | Elings et al. | 310/328 |
| 5,254,854 | 10/1993 | Betzig | 250/234 |
| 5,260,569 | 11/1993 | Kimura | 250/234 |
| 5,418,363 | 5/1995 | Elings et al. | 250/306 |

*Primary Examiner*—Stephone Allen
*Attorney, Agent, or Firm*—David I. Caplan; Martin I. Finston

[57] ABSTRACT

An optical probe microscope includes an optical fiber oriented in a vertical direction. The fiber has a tip that emits light onto a horizontal surface of a sample to be measured. This surface can have both desired and undesired departures from planarity. An electromechanical device for imparting dither motion to the fiber tip is superposed on another electromechanical device for imparting two-dimensional horizontal scanning motion to the fiber tip. The dither motion has a much higher frequency than that of the scanning motion. Between successive scannings, another device moves the sample itself from one horizontal position to another. A microscope receives the optical radiation either transmitted or reflected by the sample surface. The microscope forms a (magnified) image of this received optical radiation on the surface of an optical image position detector. The surface of this detector has a relatively large area compared with that of the (magnified) image. The resulting electrical signal developed by the detector provides desired information concerning the scanning position of the fiber tip. Also, this electrical signal is processed and fed back to a vertical pusher that maintains desirably constant the distance of the fiber tip from the sample surface.

15 Claims, 3 Drawing Sheets

OPTICAL PROBE MICROSCOPE HAVING A FIBER OPTIC TIP THAT RECEIVES BOTH A DITHER MOTION AND A SCANNING MOTION, FOR NONDESTRUCTIVE METROLOGY OF LARGE SAMPLE SURFACES

This application is a continuation of application Ser. No. 08/328,297, filed on Oct. 24, 1994, now abandoned.

FIELD OF INVENTION

This invention relates to optical probe microscopes and to methods of using them for metrology of surfaces.

BACKGROUND OF INVENTION

Optical probe microscopes are useful in such applications as measuring both the heights of, and the lateral extents between, tiny features located on the surfaces of sample bodies. These sample bodies (hereinafter called simply "samples") typically take the form of semiconductor wafers (from which many chips are typically subseqently cut). They also take the form of lithographic masks that are used to define features on such wafers, including such features as transistors as well as wiring lines that electrically connect the transistors together. Typically the width of such features can be less than approximately 0.5 µm, whereas the width of the surface of the wafer or of the lithographic mask can be more than approximately 20 cm. Because such surfaces are not necessarily perfectly smooth (planar) but can have both desired features and unwanted bumps, it is desirable to determine both the heights and widths of the features, as well as the degree of departure of such surfaces from perfect smoothness caused by the bumps. Moreover, unavoidable variations in processing parameters during fabrication of the features results in unwanted variations in the lateral dimensions of the features. Therefore, it is also desirable to be able to determine the degree of departure of the lateral dimensions of the features from the desired values. In other words, it is desirable to be able to determine the topography of the sample surface with sufficient precision. Moreover it is desirable to be able to do so nondestructively—i.e., without destroying the features.

The surfaces of these sample bodies are sometimes referred to as "major surfaces" of the sample, because the samples under consideration typically have a pair of opposed such surfaces, with linear dimensions of typically more than 20 cm×20 cm, separated by a relatively small fixed distance s. Typically this fixed distance of separation s is chosen to be in the approximate range of 0.1 mm to 10 mm.

For the sake of definiteness, the direction parallel to such major surfaces will be denoted by either the "lateral" direction, the "tangential" direction, or the "horizontal" direction; whereas the direction perpendicular to such major surfaces will be denoted by either the "normal" direction or the "vertical" direction.

A probe apparatus involving shear force sensing (SFS) can be used to determine the features and bumps of a sample surface. The apparatus orients the axis of the probe normal to the sample surface. Further, the apparatus imparts a rapid horizontal to-and-fro ("dither") force as well as a much slower horizontal raster scanning motion to the probe tip. This dither force has a frequency at or near the mechanical resonance frequency of the probe tip. The resulting amplitude of the dither motion of the probe tip yields desired information concerning the distance of the sample surface from the probe tip. Also, the resulting phase of the dither motion relative to the dither force also yields such desired information. Therefore, the apparatus measures either the amplitude or phase of the dither motion, or a combination of both, while the probe tip scans the sample surface.

The apparatus used for SFS relies on the fact that, because of the (horizontal) dither motion, shear forces arise in the probe tip that act parallel (rather than normal) to the sample surface. Such shear forces can arise from static or dynamic friction or from viscous forces in the air (or other fluid medium) located between the probe tip and the sample surface. These forces change the amplitude and phase of oscillation of the vibrating probe tip as it is brought into close proximity to the sample surface. The resulting change in the amplitude or phase of the oscillation, or a resulting change in a combination of both the amplitude and the phase, can then be used to generate a feedback signal for maintaining constant the probe tip-to-sample surface distance during scanning. This constant tip-to-surface distance prevents unwanted collisions between probe and sample, for such collisions can undesirably destroy the features of the sample surface.

An SFS probe apparatus has omni-directional force sensing capability, that is, the capability of sensing forces not only in the vertical direction but also attractive and repulsive forces in the horizontal direction. Therefore, while the probe tip undergoes dither motion, it can sense both attractive and repulsive forces exerted by sidewalls of features. In this way, while the probe tip of an SFS apparatus scans the sample surface, the apparatus can sense the presence of abrupt height changes in the sample surface.

An SFS probe apparatus can monitor the dither motion of the probe tip by focusing a light beam onto the side of the probe at a position of the probe located in close proximity to the sample surface. Sensing the resulting light intensity scattered from the probe yields a signal that represents the dither motion. For example, one technique for sensing the scattered light intensity involves passing the scattered light through a pinhole aperture onto a light detector such as a photo multiplier tube (PMT). Another technique involves detecting the scattered light by means of a segmented photodiode position sensor that is located at a position where an image of the probe has been focused prior to the existence of the dither motion. Both of these techniques sense the dither motion of the probe tip. However, relatively large magnifications are required to amplify the dither motion to an extent comparable to the detector's sensing area, in order to enable proper sensing of the dither motion. These large optical magnifications preclude desired relatively large mechanical translations of the probe tip during scanning: relatively large translations of the tip (i.e., on the order of a typical image scanning-range of several micrometers) will cause the scattered light arriving at the detector to go outside the light-detecting area, whereby the light will not be detected. Therefore, except for the dither motion the probe tip must be held stationary, and the sample (rather than the probe tip) must be raster-scanned during imaging. Holding the probe tip stationary while thus scanning the sample, however, imposes severe upper limits on the size of the sample surface that can be inspected. Therefore, full-sized samples such as wafers or masks have to be cut into small pieces (typically <10 mm×10 mm) to fit on the scanner— typically a piezo fine-scanner. Of course this limitation on sample size is undesirable in the semiconductor industry where the topography of an entire semiconductor wafer or of an entire lithographic mask must be determined nondestructively.

The teachings of U.S. Pat. No. 5,254,854, alleviate some of these problems by means of a shear-force optical microscopy (SFOM) apparatus. Such an apparatus uses optical radiation emitted by the probe tip. However, a problem of limitation on the portion of the sample surface that can be inspected by the SFOM apparatus remains.

Apparatus involving a near field scanning optical microscope (NSOM) is another approach in the art. It can be used in conjunction with SFOM, as the aforementioned patent teaches. An NSOM apparatus confines the optical radiation emitted by an optical fiber tip to a relatively small area located at the apex of the fiber. In such an apparatus, an opaque layer typically coats the entire tip of the fiber except at a relative small area located at the apex of the fiber tip, whereby the apparatus allows the emission from the fiber tip of only the near-field radiation. The NSOM approach has the advantage of obtaining, with nanometer (0.001 μm) resolution, both topographic data of the sample surface and near-field optical imaging of the sample body simultaneously. Although the aforementioned patent teaches that the NSOM approach can be integrated into the SFOM apparatus, the problem of limitation on the portion of the sample surface that can be inspected remains

SUMMARY OF INVENTION

In order to ameliorate the aforementioned problems, according to one embodiment of the invention, an optical probe microscope for inspecting a major surface of a body comprises:

(a) an optical fiber having a tip located in close proximity to the major surface;

(b) a first electromechanical device, attached to the tip, that can impart a dither motion to the tip;

(c) a second electromechanical device, attached to the first device, that can impart a scanning motion to the tip, the scanning motion having a periodicity that is at least approximately 1,000 times as large as that of the dither motion.

The microscope has omni-directional force sensing capability. Advantageously the optical probe microscope further comprises a third electromechanical device, attached to the first device, that can impart a vertical motion to the tip.

Further advantageously, the optical probe microscope further comprises a microscope arranged to receive optical radiation emitted by the surface in response to optical radiation emitted by the tip and incident on the surface.

Yet further advantageously, the optical probe microscope further comprises an optical image position detector, which is arranged to receive optical radiation from the microscope in response to the optical radiation received by the microscope, and which develops electrical outputs, in response to the optical radiation received from the microscope, that represent the position of the optical radiation received from the microscope.

Still further advantageously the optical probe microscope further comprises electronic processing circuitry arranged to receive the electrical outputs of the optical image position detector and to develop electrical outputs that represent the scanning position and the dither position of the tip of the fiber.

Still further advantageously, the optical probe microscope further includes feedback circuitry connected to receive an output from the electronic processing circuitry and to deliver a feedback signal to the third electromechanical device, whereby the tip of the fiber is maintained at a constant distance from the major surface of the body.

Still further advantageously, the optical probe microscope further includes a mechanism that can impart horizontal displacements to the body.

In a second embodiment, the invention involves a method of metrologically inspecting a major surface of a body, using an optical fiber having a tip, comprising the steps of:

(a) directing optical radiation from the tip to the major surface of the body;

(b) imparting a dither motion to the tip during step (a) by means of a first electromechanical device attached to the tip;

(c) imparting a scanning motion to the tip during steps (a) and (b) by means of a second electromechanical device attached to the first device, the scanning motion having a periodicity that is at least approximately 100 times as large as that of the dither motion.

Advantageously the method further comprises the step of imparting vertical motions to the tip during steps (a), (b), and (c) by means of a third electromechanical device.

Further advantageously, the method further comprises (d) the step of detecting the position of optical radiation coming from the major surface of the body in response to step (a); and (e) developing electrical outputs representing the position.

Advantageously further, the method further comprises electrically processing the electrical outputs of step (e) and developing electrical outputs that represent the scanning position and the dither position of the tip of the fiber.

Advantageously still further, the method further comprises developing and feeding back an electrical feedback signal, representing the deviation of the distance between the tip and the major surface from a constant value, to the third electromechanical device, whereby the distance between the tip and the major surface is restored to the constant value.

In a third embodiment, the invention involves a method of manufacturing an article comprising the steps of:

(a) providing a plurality of semiconductor bodies, each having a surface to be patterned;

(b) setting at least one process parameter;

(c) processing at least a first semiconductor body according to the process parameter such that a pattern is formed on the surface of the semiconductor body, the pattern having a characteristic dimension;

(d) measuring the characteristic dimension in the first semiconductor;

(e) comparing the characteristic dimension to a predetermined range of values;

(f) if the characteristic dimension lies outside the predetermined range of values, changing the process parameter to bring the characteristic dimension within the predetermined range of values;

(g) after step (f), processing at least a second semiconductor body in accordance with the process parameter; and (h) performing, on at least the second semiconductor body, at least one additional step toward completion of the article, characterized in that step (d) is performed in accordance with the steps recited in the second embodiment.

DETAILED DESCRIPTION

Figure 1:
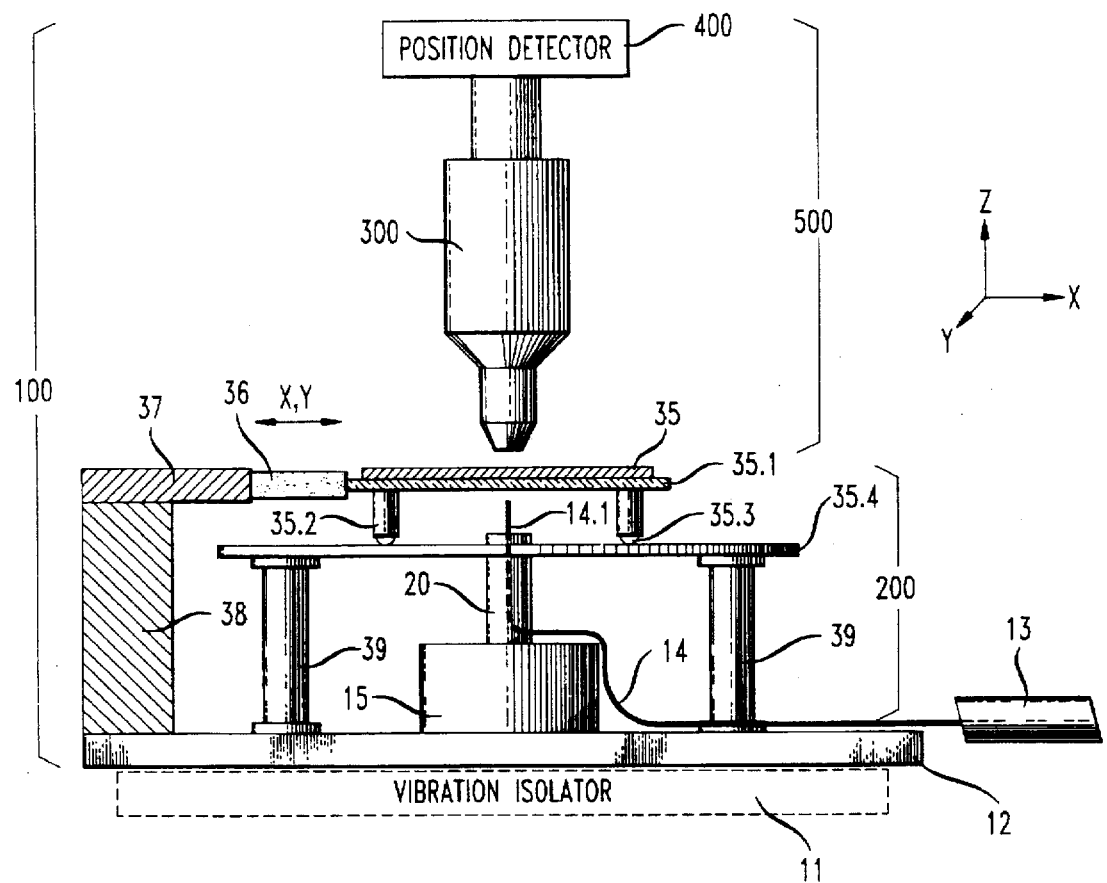
FIG. 1 is an elevational schematic diagram, partly in cross section, of an optical probe microscope including fine scanning and coarse positioning apparatus, in accordance with a specific embodiment of the invention.

As indicated in FIG. 1, an optical probe microscope 100 includes a sample holder system 200 that can horizontally move a sample 35 from one stationary position to another as described in greater detail below. The probe microscope arrangement 100 further includes an optical microscope 300 and an optical image position detector 400. The optical position detector 400 is capable of sensing the position of an optical image, formed on a sensing surface of this detector 400 by the microscope 300. The optical microscope 300 together with the optical image position detector 400 form an optical position sensing system 500. In what follows the vertical direction will sometimes be denoted by the Z direction, and the horizontal directions by the X and Y directions, as indicated by the XYZ Cartesian coordinate system shown in FIG. 1.

The sample holder system 200 includes a fine-scanner apparatus 20 that can move the tip 14.1 of an optical fiber 14 in either the X or the Y direction, and a vertical pusher 15 that can move the tip 14.1 of the fiber 14 in the Z direction. For example, the vertical pusher 15 comprises a Newport vertical pusher for coarse Z positioning of the sample 35, together with a Burleigh piezoelectric micrometer adapter for fine vertical Z positioning of the sample 35. The tip 14.1 of the fiber 14 is described in greater detail in conjunction with the description below of FIG. 3.

The sample holder system 200 can further include a conventional optical microscope base and sample stage. For example, the sample holder system 200 further includes a supporting base 12, typically a Newport optics breadboard having a horizontal cross section of approximately 0.7 m×0.7 m. The supporting base 12 is mounted on a vibration isolator 11, typically several layers of damping material such as formed by several slabs of rubber sandwiched between metal plates.

A coarse XY positioner apparatus is formed in the following manner. A holder slab 35.4, upon which ball bearings 35.3 can slide with minimal friction, is supported by posts 39, typically made of quartz or steel. The ball bearings 35.3 are typically made of ruby, but other materials can be use as known in the art. The ball bearings 35.3 are set in ball-bearing holders 35.2, typically made of quartz. In turn, the ball-bearing holders 35.2 are fixed, as by an adhesive layer (not shown), to a sample-supporter slab 35.1 upon which the sample 35 is attached. This sample-supporter slab 35.1 is also typically made of quartz. A metallic position-encoded arm 36 controls the XY position of the sample-supporter holder 35 and hence of the sample 35 itself. This metallic arm 36 can move the sample-supporter slab 35.1 in the X or Y direction in increments of typically approximately 0.1 μm. An auxiliary arm 37 mechanically can move the metallic position-encoded arm 36 in predetermined encoded increments in the X and Y directions. In turn, a rigid sidewall 38 holds the auxiliary arm 37 in place. The posts 39 thus support the holder slab 35.4 on the supporting base 12, at a fixed distance apart. The metallic position-encoded arm 36, driven by the auxiliary arm 37, thus forms the basis for the coarse positioning of the sample 35. More specifically, the position-encoded arm 35 moves the sample-supporter slab 35.1, and hence moves the sample 35, in the horizontal X and Y directions from one (stationary) position to another only at times between completion of each of the (raster) scannings of relatively small areas of the sample surface that are described below. More specifically, between such scannings it moves the sample supporter slab 35.1 from one position to another by a distance typically equal to approximately 20 μm in either the X or the Y direction. In this way, samples 35 having relatively large areas can be inspected: sample surfaces as large as 20 cm×20 cm, or even more.

During probe measurement operations and as described below in greater detail, a laser 13 delivers optical radiation into the fiber 14 through an optical coupler (not shown). Advantageously the optical radiation propagating through the fiber is single mode TEoo, for the purpose of stability of the intensity of the light emitted by the tip 14.1 of the fiber 14.

Figure 2A:
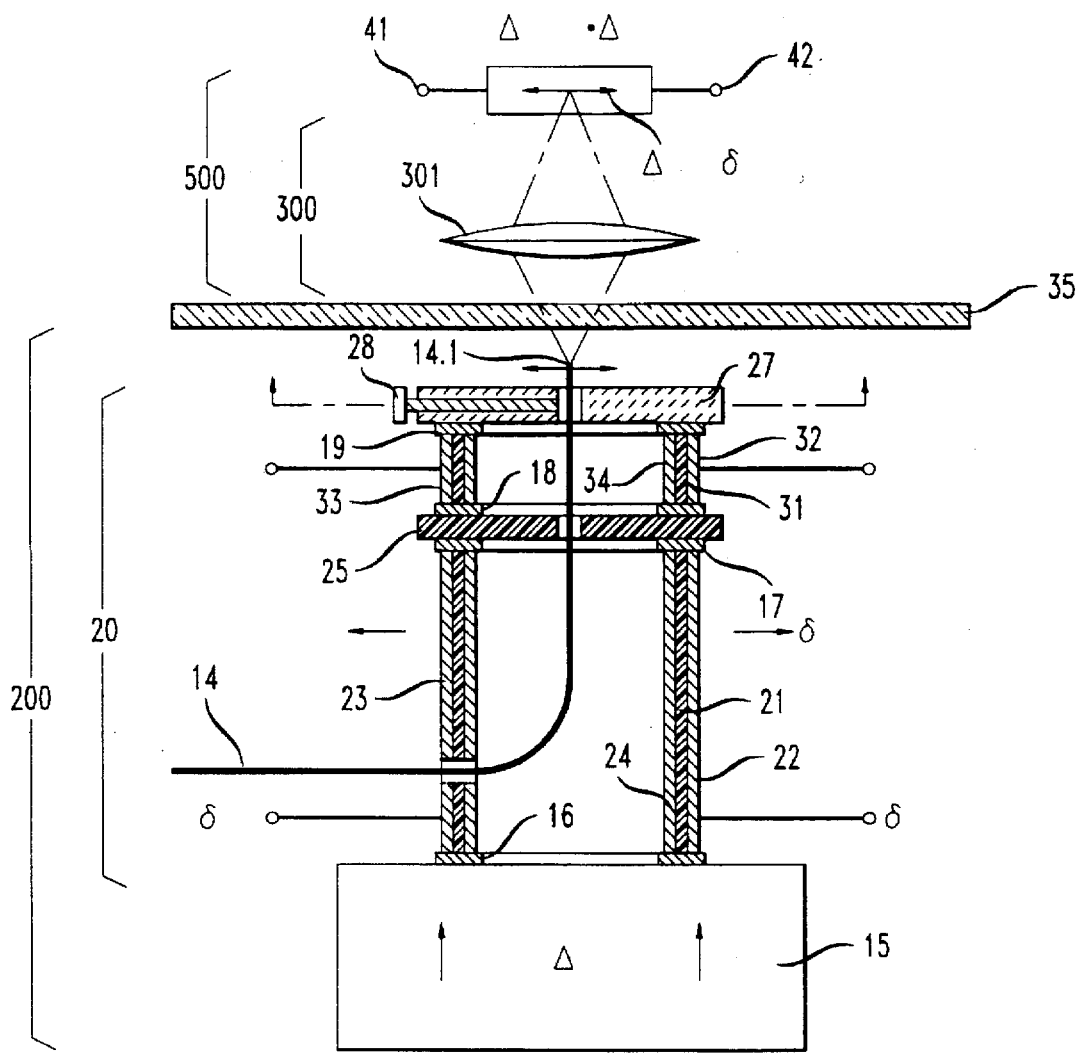
FIG. 2A is an elevational schematic diagram, partly in cross section, showing in greater detail the horizontal fine scanning apparatus of the microscope shown in FIG. 1.

As indicated in FIG. 2A, top hollow cylinder 31 made of piezo-electric material is glued to the top of the disc 25 by means of adhesive layer 18. An insulating disc 27 is glued to the top of the top cylinder 31 by means of adhesive layer 19. This disc 27 is typically made of a porcelain or ceramic material.

Figure 2B:
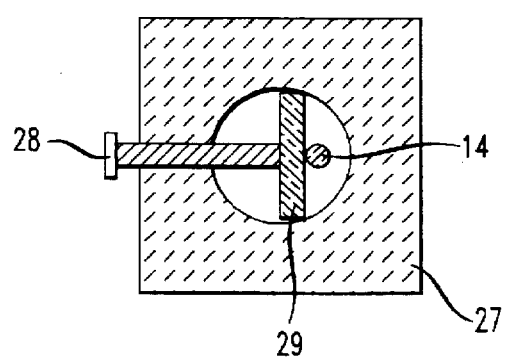
FIG. 2B is a horizontal cross-sectional diagram of the portion of the apparatus indicated in FIG. 2A.

The disc 27 has an aperture, as shown in greater detail in FIG. 2B. In this aperture the fiber 14 is glued to a surface of the glass slab 29. The position of the fiber tip 14.1 is determined and fixed by the pushing of a set screw 28 against an opposed surface of the glass slab 29. The purpose of this arrangement shown in the inset is to afford nondestructive precise mounting of the fiber 14.

As indicated in greater detail in FIG. 2A, the fine-scanner apparatus 20 includes separate outer electrodes 22 and 23 located on opposite sides of the outer surface of a bottom hollow cylinder 21 made of piezo-electric material. An inner electrode 24 is located everywhere on the inner surface of the bottom hollow cylinder 21. This cylinder 21 is glued to the top surface of the vertical pusher 15 by means of an adhesive layer 16. The fiber 14 enters into the hollow part of this cylinder through apertures in the outer electrode 23, the bottom cylinder 21, and the inner electrode 24. An electrically insulating disc (or square) 25 is glued to the top of the cylinder 21 by means of another adhesive layer 17. This disc 25 is typically made of a porcelain or ceramic material. The disc 25 has an aperture 26 through which the fiber 14 can fit. The bottom hollow cylinder 21 is much longer (in its axial direction) than the top hollow cylinder 31, typically by a factor in the approximate range of 5 to 10 or more. For example, the length of the bottom cylinder 21 is approximately 2.5 cm, whereas the length of the top cylinder 31 is approximately 0.5 cm. The radius of both top and bottom cylinders is approximately 13 mm. The material of all piezoelectric layers is typically PZT-5H, while the thicknesses of all piezoelectric layers is approximately 0.5 mm.

Each of the outer electrodes 22 and 23 subtends an angle of only approximately 90° (=π/2 radian) or less, in order to affect only the X scanning motion of the tip 14.1 of the fiber 14. The outer electrodes 22 and 23, acting in concert with the inner electrode 24, thus can control the (raster) scanning movement of the top of the hollow cylinder 21 ( and hence of the fiber tip 14.1 ) in the X direction, in response to (raster) scanning voltages δVx and δVx applied to these outer electrodes. Typically, δVx+=−δVx−, and the periodicity of these voltages is approximately only 1 sec. Also, typically a voltage bias equal to zero (ground) is applied to the inner electrode 24.

Another pair of outer electrodes (not shown) is located on the outside surface of the hollow cylinder 21 in the spaces thereon that are not occupied by the electrodes 22 and 23. In this way these outer electrodes (not shown) can control the (raster) scanning movement of the top of the hollow cylinder 21 (and hence of the fiber tip 14.1 ) in the Y direction when ac voltages (raster) scanning voltages δVy+ and δVy− (not shown) are applied to them. Thus the total number of outer electrodes located on the outer surface of the bottom hollow cylinder 21 is four. Typically the voltages δVy+ and δVy− have a periodicity of approximately 200 sec. Typically, the maximum displacement of the top of the bottom cylinder 21 caused by the voltages δVx+ and δVx− is approximately equal to 20 μm. Hence the maximum horizontal translation in the X or Y direction, respectively, produced by the scanning motion of the fiber tip 14.1 is likewise limited to approximately 20 μm. On the other hand, however, after the voltages δVx+ and δVx− effectuate each such scanning of the sample surface by the fiber tip 14.1, the sample is displaced (moved parallel to itself) horizontally by means of the position-encoded arm 36 through a predetermined distance in the X or the Y direction. Accordingly, the ratio of the total linear dimension of the surface of the sample 35 that can be inspected (aided by the position-encoded arm 36) to the linear dimension of a single scanning of the sample (effectuated by the applied voltages δVx and δδVx, or δVy+ and δVy−) is typically equal to approximately 20 cm ÷20 μm=10,000.

Changing the dc bias applied to the inner electrode 24 enables changing of the vertical position of the top region of the hollow cylinder 21, and hence changing this dc bias enables changing of the vertical position of the fiber tip 14.1 if desired.

Outer electrodes 32 and 33 are located on opposite sides of the outer surface of the hollow cylinder 31. An inner electrode 34 is located everywhere on the inner surface of the cylinder 31. Each of the electrodes 32 and 33 subtends an angle of only approximately 90°(=π/2 radian) or less, in order to affect only the X dither motion of the tip 14.1 of the fiber 14.

As further indicated in FIG. 2A, application to the outer electrodes 32 and 33 of applied voltages dVx+ and dVx−, respectively, produces this dither motion. Since dither motion only in the X direction is required, another pair of outer electrodes located on the outer surface of the top hollow cylinder 21 is not needed. The outer electrodes 32 and 33, acting in combination with the inner electrode 34, thus can control the dither movement dX of the fiber tip 14.1, in similar fashion as describe above in connection with the raster scanning of this fiber tip. However, the dither periodicity produced by the voltages dVx+=−dVx is typically much lower than the scanning periodicity produced by the applied voltages δVx+ and δVx−.

Typically the frequency of the voltages dVx+=−dVx− is in the approximate range of 20 kHz to 100 kHz—that is to say, the dither periodicity is in the approximate range of 0.00005 sec to 0.00001 sec. In any event, the frequencies of the voltages dVx+=−dVx−, as well as of the voltages δVy+ and δVy−, are selected to avoid mechanical resonances of the both the upper and the lower cylinders. The resulting amplitude of the dither motion is equal to typically approximately 0.05 μm.

As further shown in FIG. 2A, the sample 35 is located between the tip 14.1 of the fiber 14 and the microscope 300. This microscope 300 typically comprises one or more lenses, arranged to produce a magnified image of the optical radiation arriving from the sample 35 on an optical detecting surface of a light image sensor located in the optical image position detector 400, as described in greater detail below. The optical image position detector 400 has a pair of output terminals 41 and 42. During operations, signals coming from the output terminals 41 and 42 yield desired information concerning the instantaneous value of the X coordinate of the fiber tip 14.1, also as described in further detail below. Similarly, the optical image position detector 400 has another pair of output terminals 43 and 44 (not shown in FIG. 2A or FIG. 2B, but shown in FIG. 4) suitable for yielding desired information concerning the instantaneous value of the Y coordinate of the fiber tip 14.1, also as described in further detail below.

Figure 3:
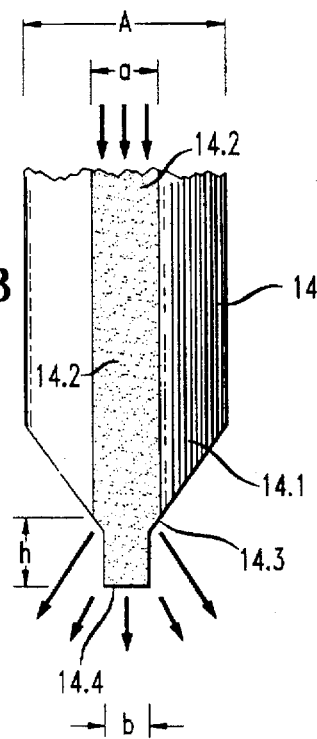
FIG. 3 is a cross sectional view of an end portion of an optical fiber including its tip.

FIG. 3 shows the tip 14.1 of the fiber probe 14 in greater detail. The fiber 14 has a diameter A of typically approximately 125 μm. It also has a core region 14.2 of diameter a typically equal to approximately 3 μm. The tip 14.1 of the fiber 14 tapers to a diameter b typically equal to approximately 0.2 μm. The taper is arranged so that the resulting intersection 14.3 of the core region 14.2 with the surface of the fiber tip 14.1 is separated by a height h from the extreme apex surface 14.4 of the fiber tip 14.1. Typically this height h is equal to approximately 5 μm.

During operations, the apex surface 14.4 is maintained at a constant distance S of separation from the nearest point of the top surface of the sample 35, as described in greater detail below. Typically this distance S is equal to approximately 0.05 μm.

Figure 4:
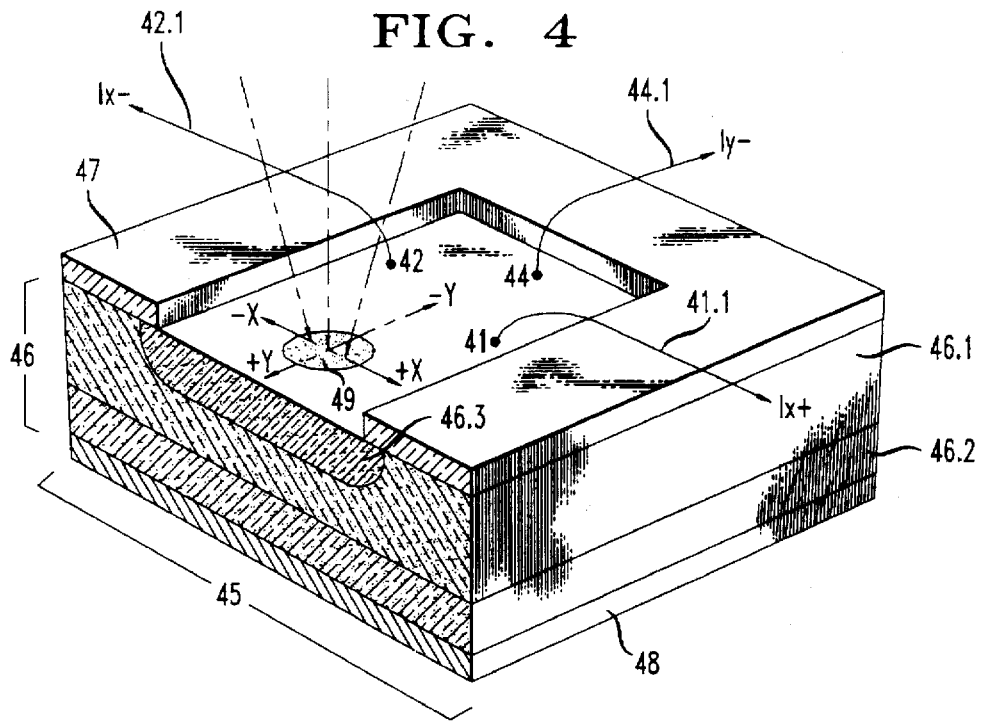
FIG. 4 is an elevational cross-section view of a continuous position sensor, useful in the practice of the invention.

The microscope 300 in its simplest form (not shown) can take the form of an objective lens and an eyepiece arranged to produce a real image on the surface of a continuous position sensor 45 (FIG. 4). In another embodiment the microscope comprises four lenses (not shown): an objective lens that forms a real image on a focal plane of a collimating lens, an auxiliary lens that forms a real image of the light emerging from the auxiliary lens, and another collimating lens having a focal plane locate on the real image formed by the auxiliary lens—whereby the light emerging from the microscope is in the form of a parallel beam. Typically the magnification of the lens system thus formed in the microscope 300 is approximately 1,000.

Figure 5:
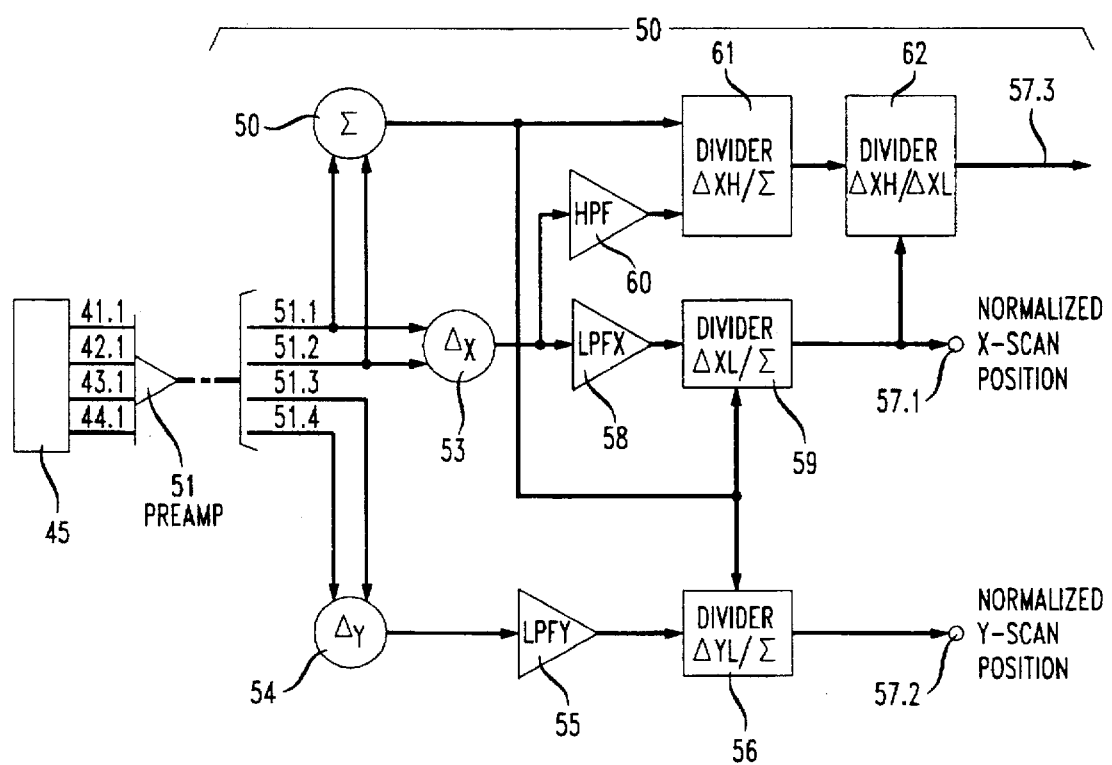
FIG. 5 is a block diagram of electronic processing circuitry for use in the practice of the invention in accordance with the specific embodiment thereof.

As shown in FIGS. 4 and 5, the optical image position detector 400 comprises the continuous position sensor 45 (FIG. 4) plus suitable electronic processing circuitry 50 (FIG. 5) for converting output currents of this continuous position sensor 45 into output voltages representing normalized values of the X and Y coordinates (locations) of the position of the tip 14.1 of the optical fiber 14. Here the term "normalized" refers to a determination of the values of X and Y that is not spuriously influenced by fluctuations in the optical intensity produced by the optical source 13 (FIG. 1 ) or by other fluctuations in the optical intensity emitted by the tip 14.1 of the fiber 14.

Illustratively, this continuous position sensor 45 comprises a semiconductor PIN-conductivity type structure 46.

This structure 46 is formed by a semiconductive silicon bulk region 46.1, having N type conductivity, into whose bottom surface an N+ type conductivity region 46.2 has been diffused and into whose top surface a P+ type conductivity region 46.3 has been diffused. A protective layer 47, typically of silicon dioxide, is located on the top surface of the structure 46. This protective layer 47 is electrically insulating and has an aperture. Thus, light can be incident on the exposed top surface of the P+ diffusion region 46.3, as known in the art. Typically the aperture takes the form of a square, as indicated in FIG. 4.

An electrically conducting layer 48 is located on the bottom surface of the structure 46 in electrical contact with the bottom surface of the N+ type conductivity region 46.2, as known in the art of semiconductor photodetectors. The terminals 41,42, 43 (not shown in FIG. 4), and 44 are located on the top surface of the P+ region 46.3 at four respective localized areas thereof located (FIG. 4) near the edge of the aperture in the protective layer 47.

As further shown in FIG. 4, light from the microscope 300 is incident on the top surface of the P+ diffusion region 46.3 to form an image spot 49 thereon through the aperture in the protective layer. Advantageously, the lateral dimensions of this spot are much smaller than those of the aperture in the protective layer 47. For example, the aperture in the protective layer 47 has the form of a square with an area equal to approximately 10 mm×10 mm, whereas the linear dimension of the image spot 49 in any direction is in the approximate range of 0.1 mm to 1.0 mm. Thus the ratio of any linear dimension of the aperture to that of the spot 49 is in the approximate range of at least 10 to 100.

Typically, a negative voltage bias is applied between the P+ diffusion region 46.3 and the N− bulk region 46.1, during detection of the position of the image spot 49 by the continuous position sensor 45. The resulting electrical currents lx+, lx−, ly+, and ly−that are respectively generated on wires 41.1, 42.1, 43.1 (not shown in FIG. 4) and 44.1 respectively attached to the terminals 41,42, 43, and 44, yield the desired information concerning the XY position of the image spot 49 on the top surface of the P+ diffusion region 46.3, as known in the art. In particular, the difference (lx+−lx−) between the electrical currents lx+ and lx− is proportional to the X coordinate of the spot 49 measured from the center of the square aperture in the protective layer 47. Thus, lx+−lx−=C$\Delta$X, where $\Delta$X denotes $\mu$X+dX, as is desired in the practice of this invention. Similarly, the difference between ly+ and ly− is proportion to the Y coordinate of the spot 49 measured from the center of the square aperture in the protective layer 47. Thus, ly+−ly−= C$\Delta$Y, where $\Delta$Y denotes $\delta$Y+dY, as is also desired in the practice of the invention. These proportionality relationships assume, of course, that the square aperture is symmetrically situated with respect to the active photodetecting region of the structure 46. It should also be remembered that since typically there need be no dither motion in the Y direction, typically dY=0.

As shown in FIG. 5, the four outputs on wires 41.1, 42.1, 43.1, and 44.1, generated by the continuous position sensor 45, are fed to a preamplifier 51. Two of the resulting four voltage outputs of this preamplifier 51—namely, 51.1 and 51.2, proportional to lx+ and lx−, respectively—are fed to a summing amplifier 50 (labeled $\Sigma$) and to a difference amplifier 53 (labeled $\Delta$x). Another two of the resulting four voltage outputs of the preamplifier 51—namely, 51.3 and 51.4, proportional to ly+ and ly−, respectively—are fed to another difference amplifier 54 (labeled $\Delta$y). As used herein, the term "fed" refers to the situation where the output terminal(s) of one device is (are) connected to the input terminal(s) of another device, whereby the output signal(s) developed by the one device constitute the input signal(s) to the other device.

The difference amplifier 54 produces an output voltage that is proportional to ly+−ly− and hence to C$\Delta$Y, and this output voltage is fed to an input terminal of a low pass filter 55 (labeled LPFY). This low pass filter 55 has an output that is proportional to only the low frequency components in the signal fed to it, typically to only those frequency components in $\Delta$Y that are less than approximately 100 Hz. The output of this low pass filter 55 is fed to the numerator terminal of a divider 56. On the other hand, the output of the summing amplifier 52 is fed to a denominator terminal of the divider 56 (labeled $\Delta$EL/$\Sigma$). Thus the output of the divider 56, which is fed to an output terminal 57.2 of the electronic processing circuitry 50, is proportional to $\Delta$EL/$\Sigma$, which is the normalized Y position of the low frequency (i.e., scanning) component of the tip 14.1 of the fiber 14, as is desired. Typically there is no dither component in the Y coordinate of the position of the tip 14.1, as mentioned above. Even if there were such dither component in the Y direction, it would have no influence on the signal appearing at the output terminal 57.2: the low pass filter 55 would not allow any such dither (high) frequency components to pass through it.

The normalized X position of the scanning of the tip 14.1 of the fiber 14 is determined in a similar manner. More specifically, the output of the difference amplifier 53 is fed to a numerator input terminal of another divider 59 via another low pass filter 58 (labeled LPFX). The frequency pass characteristic of this low pass filter 58 is to that of the low pass filter 55 described above. The output of this low pass filter 58 is fed to a numerator input terminal of another divider 59 (labeled $\Delta$XL/$\Sigma$) to whose denominator input terminal the output of the summing amplifier 52 is fed. The output of the divider 59 is fed to another output terminal 57.1 of the electronic processing circuitry 50. Because the high frequency components cannot pass through the low pass filter 58, the dither motion of the tip 14.1 of the fiber 14 has no influence on the output of the divider 59. Thus the electrical signals appearing at both of the output terminals 57.1 and 57.2 of the electronic processing circuitry 50 are respectively proportional to the X and Y scanning positions (uninfluenced by dither motion) of the tip 14.1 of the fiber 14, as is desired in the practice of the invention.

For the purpose of monitoring and controlling the dither motion of the tip of the fiber 14, the output of the difference amplifier 53 is also fed to an input terminal of a high pass filter 60 (labeled HPF). This high pass filter 60 has an output that is proportional to only high frequency components of its input, typically to those components higher than approximately 10 kHz in the case where the frequency of the dither motion is in the approximate range of 20 kHz to 100 kHz. This output of the high pass filter 60 is fed to a numerator input terminal of still another divider 61 (labeled $\Delta$XH/$\Sigma$) whose denominator input terminal is connected to the output terminal of the summing amplifier 52. Thus the output of the divider 61 is proportional to the normalized high (dither) frequency components of the motion of the tip 14.1 of the fiber 14 in the X direction. In turn, the output of this divider 61 is fed to a numerator input terminal of yet another divider 62 (labeled $\Delta$XH/$\Delta$XL) to whose denominator input terminal the output of the divider 59 is fed. Thus the output signal 57.3 of the divider 62 is proportional to $\Delta$XH/$\Sigma$+$\Delta$XL/$\Sigma$= $\Delta$XH+$\Delta$XL—that is to say, is proportional to the dither position divided by the scanning position. The purpose of this division by the divider 62 is to normalize the dither position with respect to the scanning position, in order to correct for nonuniformities in the detection sensitivity of the surface of the structure 46 of the continuous position sensor 45 (FIG. 4) It is desirable that this ratio be maintained at a constant, predetermined value, in order to maintain the distance of separation S between the apex surface 14.4 of the fiber 14 and the nearest point on the top surface of the sample 35 at a constant, predetermined value. The feedback circuitry 70 shown in FIG. 6 is designed to accomplish this task.

Figure 6:
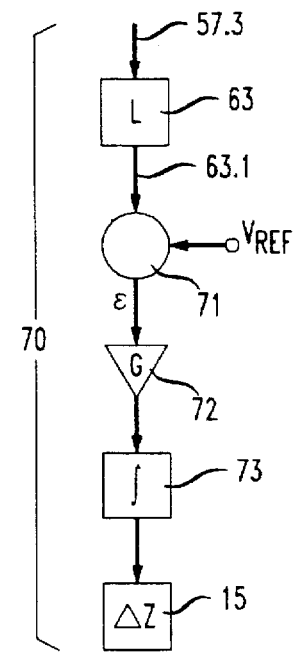
FIG. 6 is a block diagram of a specific embodiment of electronic feedback circuitry for use in the practice of this the invention in accordance with the specific embodiment thereof.

As shown in FIG. 6, the normalized dither signal 57.3 is fed to an input terminal of a lock-in amplifier 63 (labeled L) that converts the normalized dither signal 57.3 to a corresponding dc level. More specifically, the lock-in amplifier 63 develops an output voltage signal 63.1 that has a dc level A that is proportional to the amplitude of the dither motion divided by the amplitude of the raster motion.

Alternatively, this lock-in amplifier 63 is arranged to develop an output voltage that is proportional to the sine of the phase shift $\phi$ (i.e.,to sin $\phi$) produced by the dither motion relative to the voltages dVx+ and dVx−applied to the outer electrodes 32 and 33 (FIG. 2A). As another alternative, the lock-in amplifier 63 is arranged to develop an output voltage that is proportional to A sin$\phi$. At any rate, the output voltage signal 63.1 is then fed to the input terminal 71.1 of another difference amplifier 71. This difference amplifier 71 has another input terminal to which a reference voltage $V_{REF}$ is applied during operations. This reference voltage $V_{REF}$ is selected to maintain the dither amplitude of the tip 14.1 of the probe 14 at a desired value. The output of the difference amplifier 71 constitutes an error signal (labeled $\epsilon$) which is fed to an input terminal of a gain amplifier 72 (labeled G). The output of this gain amplifier 72 is fed to an integrator 73 (labeled $\int$). This integrator 73 advantageously has an integration time constant that is equal to approximately one millisec, that is a time constant that is much larger than the scanning periodicity but is somewhat less than the dither periodicity. Finally, the output of the integrator 73 is fed to the vertical pusher 15, whereby the vertical pusher 15 moves the fiber 14 in the Z direction in such a manner as to reduce the error signal $\epsilon$ substantially to zero. In this way, the feedback circuitry 70 cooperates with the signal 57.3 produced by the electronic processing circuitry 50 to maintain the dither amplitude at a constant value and at the same time also to maintain the distance of separation S between the apex surface 14.4 of the fiber 14 and the nearest point on the top surface of the sample 35 at a constant value.

The inventive optical microscope 100 can applied to the field of manufacturing devices, such as the field of manufacturing devices by means of processes that involve, for example, patterning a surface of a substrate. Such a a substrate is a pattern of metallic conductors. This pattern of metallic conductors is formed by deposition of a metallic layer followed by deposition of a resist layer, selective exposure of the resist layer to actinic radiation, development of the resist layer to form a patterned resist layer, and etching the exposed portions of the metallic layer (not coated by the thus patterned resist layer) to form elongated metallic conductors. Such processes are characterized by process parameters that often must be optimized by trial and error. One or more substrates are typically processed in this way for trial purposes. The pattern, which has been formed on a major surface of such a substrate according to initial process parameters, is inspected with the inventive optical probe microscope. During such inspection, the substrate together with its pattern of metallic conductors takes the place of the sample 35 (FIGS. 1 & 2) described above. In this way, one or more characteristic dimensions on the major surface of the substrate, such as metallic conductor linewidths, are measured, as described above. If the characteristics fail to conform to predetermined desired specifications, one or more of the process parameters are modified in order to bring subsequently processed substrates into conformity with the specifications.

Although the invention has been described in detail in terms of a specific embodiment, various modifications can be made without departing from the scope of the invention. For example, instead of piezo-electric induced motions in the top or bottom cylinder, or in both of them, other forms of induced motions can be used such as motions induced by magnetic-field-induced actuators, as known in the art. Instead of using transmission of light from the tip 14.1 of the fiber 14 through the sample 35 to the microscope 300, the fiber can be positioned in such a way that reflection of light from the top surface of the sample 35 arrives at the microscope 300.

The invention claimed is:

1. An optical probe microscope comprising:
   (a) an optical fiber having a tip placeable in close proximity to a surface of a body;
   (b) a first electromechanical device, attached to the tip, that can impart a dither motion to the tip;
   (c) a second electromechanical device, attached to the first device, that can impart a scanning motion to the tip, the scanning motion having a periodicity that is at least approximately 100 times as large as that of the dither motion;
   (d) a microscope arranged to receive optical radiation emitted by a surface of a body in response to optical radiation emitted by the tip and incident on the surface; and
   (e) an optical image position detector, which is arranged to receive optical radiation from the microscope in response to the optical radiation received by the microscope, the optical image position detector having a continuous position-sensitive photoelectric surface region, the optical radiation being focused by the microscope to form an image spot on the photoelectric surface region, the spot having lateral dimensions that are less than approximately one-tenth the lateral dimensions of the photoelectric surface region, whereby the optical image position detector develops electrical outputs, in response to the optical radiation received from the microscope, that represent the position of the image spot.

2. The optical probe microscope of claim 1 in which the spot has lateral dimensions in the approximate range of one-tenth to one-hundredth of the lateral dimensions of the photoelectric surface region.

3. The optical probe microscope of claim 1 further including a mechanism that can impart horizontal displacements to the body, the mechanism comprising an arm attached to a slab that can support the body.

4. The optical probe microscope of claim 3 further comprising electronic processing circuits arranged to receive the electrical outputs of the optical image position detector and to develop electrical outputs that represent the scanning position and the dither position of the tip of the fiber.

5. The optical probe microscope of claim 1 further comprising a third electromechanical device, attached to the first device, that can impart a vertical motion to the tip.

6. The optical probe microscope of claim 5 in which the spot has lateral dimensions in the approximate range of one-tenth to one-hundredth of the lateral dimensions of the photoelectric surface region.

7. The optical probe microscope of claim 5 further comprises electronic processing circuitry arranged to receive the electrical outputs of the optical image position detector and to develop electrical outputs that represent the scanning position and the dither position of the tip of the fiber.

8. The optical probe microscope of claim 7 further including a mechanism that can impart horizontal displacements to the body, the mechanism comprising an arm attached to a slab that can support the body.

9. The optical probe microscope of claim 7 further including feedback circuitry connected to receive an output from the electronic processing circuitry and to deliver a feedback signal to the third electromechanical device, whereby the tip of the fiber is maintained at a constant distance form the surface of the body.

10. The optical probe microscope of claim 9 further including a mechanism that can impart horizontal displacements to the body, the mechanism comprising an arm attached to a slab that can support the body.

11. A method of metrologically inspecting a major surface of a body, using an optical fiber having a tip, comprising the steps of:

(a) placing the tip in close proximity to the major surface and directing first optical radiation into the fiber at an end thereof distal to the tip, whereby optical radiation is incident on the major surface of the body;

(b) during step (a) applying dither voltages to a first electromechanical device, attached to the tip, whereby a dither motion is induced in the tip in response thereto;

(c) during step (b) applying scanning voltages to a second electromechanical device, attached to the first electromechanical device, whereby a scanning motion is induced in the tip in response to the scanning voltages, the scanning motion having a periodicity that is at least approximately 1,000 times as large as that of the dither motion; and focusing second optical radiation, coming from the body in response to the first optical radiation, to an optical image spot on a continuous position-sensitive photoelectric surface having lateral dimensions that are at least approximately ten times the lateral dimensions of the optical image spot.

12. The method of claim 11 further comprising the step of (d) applying vertical motion voltages to a third electromechanical device, attached to the fiber, whereby vertical motions are induced in the tip during steps (a), (b), and (c) in response to the vertical motion voltages.

13. The method of claim 12 further comprising the steps of (d) detecting the position of optical radiation coming from the major surface of the body in response to step (a); and (e) developing electrical outputs representing the position.

14. The method of claim 13 further comprising electrically processing the electrical outputs of step (e) and developing electrical outputs that represent the scanning motion and the dither motion of the tip of the fiber.

15. The method of claim 14 further comprising developing and feeding back an electrical feedback signal, representing the deviation of the distance between the tip and the major surface from a constant value, to the third electromechanical device, whereby the distance between the tip and the major surface is restored to the constant value.

\* \* \* \* \*